United States Patent Office 3,497,500
Patented Feb. 24, 1970

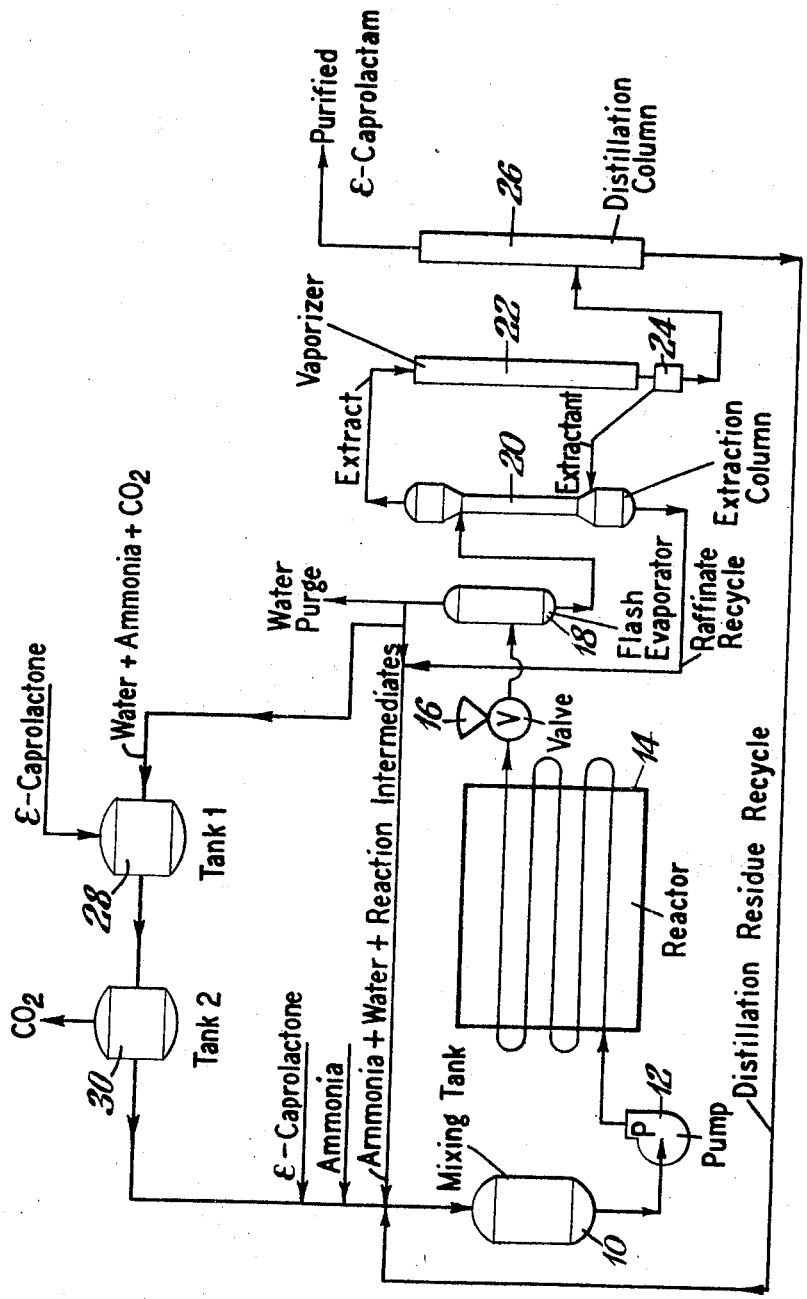

3,497,500
PROCESS FOR PRODUCTION OF
EPSILON-CAPROLACTAM
Harold E. Kyle and George C. Heilig, St. Albans, W. Va.,
assignors to Union Carbide Corporation, a corporation
of New York
Filed June 16, 1967, Ser. No. 646,543
Int. Cl. C07d 41/06
U.S. Cl. 260—239.3                     11 Claims

ABSTRACT OF THE DISCLOSURE

In the production of epsilon-caprolactam by reaction of epsilon-caprolactone, or a derivative thereof, with ammonia in the presence of water at superatmospheric pressure and elevated temperature, improved yield is achieved by removing from the process system at least a part of the carbon dioxide generated therein so as to maintain a low level of carbon dioxide in the reaction zone. A particularly desirable method of effecting removal of the carbon dioxide is to withdraw from the process an aqueous stream containing both ammonia and carbon dioxide and treat this stream with the epsilon-caprolactone, or derivative thereof, employed as starting material to effect reaction with the ammonia and subsequently effect release of the carbon dioxide.

---

This invention relates to the production of epsilon-caprolactam. More particularly, this invention relates to an improvement in the known process of producing epsilon-caprolactam by reaction of epsilon-caprolactone, or derivatives thereof, with ammonia in the presence of water at superatmospheric pressures and elevated temperatures whereby improved yields are obtained. In a particular embodiment, the invention relates to an improved continuous two-stage process wherein epsilon-caprolactam is produced from epsilon-caprolactone in particularly high yields and with minimum formation of unwanted by-products.

It is known to the art to produce epsilon-caprolactam by the reaction of epsilon-caprolactone, or derivatives thereof, with aqueous ammonia at superatmospheric pressures and elevated temperatures. Although this reaction provides a markedly superior route to the production of epsilon-caprolactam as compared with earlier methods, it does, however, suffer from certain disadvantages which have significantly hindered its commercial development. In particular, the process is hampered by a relatively low yield of the desired product. It is toward the objective of improving this process by enhancing the yield of product obtainable that the present invention is directed.

It has now been discovered that carbon dioxide generated in the process of reacting epsilon-caprolactone, or derivatives thereof, with ammonia in the presence of water at superatmospheric pressure, such as, for example, pressures in excess of about 1000 p.s.i.g., and elevated temperature, such as, for example, temperatures in excess of about 300° C., has a deleterious effect on the reaction and, in particular, that it seriously inhibits the yield of epsilon-caprolactam. It has been further found that removal of the carbon dioxide from the process system so as to maintain a relatively low concentration of carbon dioxide in the reaction zone, as hereinafter described in greater detail, is capable of substantially overcoming such deleterious effect and thereby significantly improving the yield of epsilon-caprolactam.

The exact manner in which carbon dioxide acts to deleteriously affect the reaction and bring about a reduction in yield of epsilon-caprolactam is not presently known. It is clear, however, that carbon dioxide is formed as a decomposition product of the reaction and apparent that it can react with any excess ammonia that is present to form a complex of ammonium carbonate and/or bicarbonate and that it may also undergo other reactions in the process system. Either the carbon dioxide itself, or its various combined forms, apparently may act to adversely affect the yield. Accordingly, to achieve the benefits of this invention it is only necessary that the concentration of "carbon dioxide" be maintained at a low level in the reaction zone; "carbon dioxide" being defined in this instance to mean both free carbon dioxide and combined forms such as ammonium carbonate, ammonium bicarbonate, organic amine carbonates, and the like.

The process to which this invention relates can be conducted by utilizing batch operation, but because of the relatively low yield per pass it will ordinarily involve recycling of reaction intermediates and unconverted starting materials. Regardless of the exact manner of operation, the material recycled may be considered to be "reactor effluent," using this term in a broad sense to include the raw reaction product mixture issuing directly from the reaction zone or the reaction product mixture remaining after any number of physical or chemical removals of portions thereof. As a result of such recycling, there is a gradual build-up of carbon dioxide, and/or the various combined forms thereof, in the process system and a consequent continuing decrease in product yield with prolonged recycle operation. The present invention thus finds particular application in processes utilizing recycle where the effects of carbon dioxide on the reaction would, without the benefit of this invention, become progressively worse because of increase in its concentration in the process system.

The present invention is applicable to processes wherein the starting material is epsilon-caprolactone, or a derivative of epsilon-caprolactone which is capable of being converted to epsilon-caprolactam by reaction with ammonia in the presence of water at superatmospheric pressure and elevated temperature, or a mixture of epsilon-caprolactone and/or one or more of such derivatives.

Derivatives of epsilon-caprolactone which may be employed to produce epsilon-caprolactam by reaction with aqueous ammonia at superatmospheric pressure and elevated temperature are known to the art and include the following: epsilon-hydroxycaproic acid, epsilon-aminocaproic acid, epsilon-acetoxycaproic acid, epsilon-hydroxycaproamide, epsilon hydroxy-capronitrile, ammonium epsilon-hydroxycaproate, poly(epsilon-caprolactone), epsilon-caprolactone adducts of epsilon-hydroxy-caproic acid, and epsilon-caprolactone adducts of epsilon-acetoxycaproic acid.

The invention is specifically illustrated herein by reference to a continuous two-stage process for conversion of epsilon-caprolactone to epsilon-caprolactam which is disclosed and claimed in United States Patent 3,320,241, issued May 16, 1967, and assigned to the same assignee as the present application. However, as explained hereinabove, the invention is also applicable to any of the processes of the prior art whereby epsilon-caprolactone, or a derivative thereof, is reacted with ammonia in the presence of water at superatmospheric pressure and elevated temperature to thereby produce epsilon-caprolactam.

In the continuous two-stage process of the aforesaid United States Patent 3,320,241, epsilon-caprolactone, ammonia and water are admixed in a first stage operated at relatively low temperatures for a period of time sufficient to effect substantial conversion of the epsilon-caprolactone to reaction intermediates, i.e. materials which can be converted to epsilon-caprolactam under the process conditions, and then the first stage reaction mixture so produced is permitted to undergo reaction in a second stage operated at the high temperatures and high pressures that are required to form epsilon-caprolactam. The epsilon-caprolactam is then separated from the unreacted starting materials and reaction intermediates, formed in the first and/or second stage reactions, and these are recycled to the first stage where they combine with the incoming feed. Since on being returned to the first stage the reaction intermediates pass through the entire two-stage process and are thereby converted to epsilon-caprolactam, such recycling results in a very high proportion of the epsilon-caprolactone in the feed being ultimately converted to product. The epsilon-caprolactam separated from the second stage mixture is, of course, contaminated with impurities and must be subjected to extensive purification procedures, but substantially all residues resulting therefrom can also be recycled to the first stage and eventually recovered as product. This method of operation effectively avoids the formation of substantial amounts of reaction by-products, i.e. materials which cannot be converted to epsilon-caprolactam under the process conditions.

The second stage of the two-stage process comprises a high temperature, high pressure conversion of the complex mixture of reaction intermediates to epsilon-caprolactam. The feed to the second stage is, of course, the reaction mixture formed in the first stage of the process, while the product of the second stage is a crude epsilon-caprolactam rich stream from which purified epsilon-caprolactam is recovered. The second stage reaction is carried out at temperatures of from about 300° C. to about 400° C., preferably from about 335° C. to about 370° C., and pressures of at least about 2000 p.s.i.g., preferably from about 2500 p.s.i.g. to about 10,000 p.s.i.g., and more preferably from about 3000 p.s.i.g. to about 5000 p.s.i.g. The contact time for the second stage reaction may range from a few minutes to several hours, the only essential limitation being that the period be of sufficient duration to result in formation of epsilon-caprolactam. Contact times of from 20 to 90 minutes are preferred.

The reaction mixture from the second stage is subjected to conventional procedures for recovery of the epsilon-caprolactam, for example, the epsilon-caprolactam may be recovered by evaporation, extraction, recrystallization, or distillation techniques, or various combinations thereof, and the residue remaining after removal of the epsilon-caprolactam is recycled to the first stage where it is admixed with the incoming feed. The recycle to the first stage may be made up of several separate streams, for example, ammonia and water separated from the second stage reaction mixture by flash evaporation, an extraction raffinate containing reaction intermediates such as polymerized epsilon-caprolactone and polymerized epsilon-caprolactam, and a residue from the final distillation steps in which the epsilon-caprolactam is purified.

As described in United States Patent 3,320,241, the rate of feed to the first stage and the rate of recycle are controlled so as to maintain a concentration of reactants which provides minimum formation of unwanted reaction by-products which cannot be converted to epsilon-caprolactam under the process conditions, such as delta-methyl-delta-valerolactam. Thus, the first stage of the two-stage process is operated so as to maintain a ratio of about 2 to about 12 moles of ammonia and about 3 to about 26 moles of water per mole equivalent of epsilon-caprolactone. All reaction intermediates convertible to epsilon-caprolactam under the process conditions are equivalents of epsilon-caprolactone for the purposes of the reaction involved and hence the expression "per mole equivalent of epsilon-caprolactone" is employed herein and in the appended claims to make clear that the stated concentrations of ammonia and water are based upon epsilon-caprolactone plus reaction intermediates. The preferred ratios are from about 3 to about 5 moles of ammonia and from about 5 to about 20 moles of water per mole equivalent of epsilon-caprolactone.

In contrast with the temperatures of at least about 300° C. that are required in the second stage, the first stage must be operated at a temperature of below about 200° C. The first stage may be operated under any desired pressure as long as it is a pressure at least equal to the autogenous pressure. Particularly convenient conditions for operation of the first stage are temperatures from ambient to about 125° C. and pressures of about 50 p.s.i.g. to about 500 p.s.i.g., but any suitable conditions meeting the criteria set forth above, i.e. temperature below about 200° C. and pressure at least equal to autogenous pressure, may be employed. The residence time in the first stage may vary, depending on temperature, composition, etc., from a few minutes, e.g. 5 minutes, to several hours, e.g. 5 hours. A preferred procedure is to operate so as to produce an equilibrium mixture in the first stage since this results in minimum formation of unsaturated molecules such as delta-hexenamide and delta-hexenoic acid which are precursors of the unwanted delta-methyl-delta-valerolactam.

As disclosed hereinabove, upon prolonged operation of a recycle process for producing epsilon-caprolactam there will be a continued decrease in the single-pass yield as a result of the presence of carbon dioxide formed as a decomposition product in the process system. More specifically, concentrations of carbon dioxide in the reaction zone of several percent or higher, based on the total weight of the reaction mixture, will decrease the single-pass yield of epsilon-caprolactam to as low as 50 percent or less of the yield which can be achieved in the absence of carbon dioxide.

In accordance with this invention, the yield of epsilon-caprolactam is enhanced by removing from the process system at least a part of the carbon dioxide generated therein so as to reduce the concentration of carbon dioxide in the reaction zone and thereby obtain an improved yield of epsilon-caprolactam. It is preferred that sufficient carbon dioxide be removed to maintain the concentration of carbon dioxide in the reaction zone at a level of below about 5 weight percent (calculated as $CO_2$), based on the total weight of the reaction mixture, and, most preferably, at a level of below about 2.5 percent by weight.

As employed herein, and in the appended claims, the term "reaction zone" is intended to mean that portion of the process system in which epsilon-caprolactam is formed.

Where this invention is applied to a recycle process, such as the continuous two-stage process described hereinabove and in the aforesaid United States Patent 3,320,241, the result is that the single-pass yields originally achieved are substantially maintained with continued operation. The carbon dioxide may be removed intermittently or in a continuous manner, as long as the concentration within the reaction zone is reduced, and, preferably not permitted to exceed the specified limit of 5 weight percent for any substantial period of time. In commercial operation it would not, of course, ordinarily be feasible to remove all of the carbon dioxide produced and it is instead sufficient to maintain the concentration at any desired level where adequate yield is achieved. Thus, for example, in carrying out the continuous two-stage process it is ordinarily fully satisfactory to maintain a level of carbon dioxide in the stream entering the second stage of the process of 2 percent by weight, since at this concentration the decrease in single-pass yield will not exceed at most a few percent, whereas a level of carbon dioxide substantially in excess of 5 percent could not be tolerated since the single-pass yield would then be greatly reduced. The optimum level at which carbon dioxide should be maintained will, as would be apparent to one skilled in the art, depend upon a balance between competing factors, such as the desire for the highest single-pass yield obtainable and the increasing difficulty of removing the carbon dioxide as very low concentrations are approached.

The particular manner in which the carbon dioxide is removed from the reaction system is not a critical aspect of the present invention, since the sole essential requirement is that the concentration of carbon dioxide in the reaction zone be reduced below what it would otherwise be, and preferably maintained at or below the limit specified hereinabove. One simple way of accomplishing this is to provide for the continuous or intermittent withdrawal of an aqueous purge stream containing carbon dioxide and ammonia from the process system. Alternatively, carbon dioxide, in free or combined form, may be removed from the feed stream to the reactor, or from the effluent stream from the reactor, either immediately or after subsequent treatment, or from the reactor itself. Carbon dioxide may be removed from aqueous ammonia solution by several techniques known to the chemical processing industry, for example, by multiple distillation, or by scrubbing with sodium hydroxide, potassium hydroxide, soda lime, or monoethanolamine, and any of these procedures may be employed in accordance with this invention.

In conducting the continuous two-stage process, a particularly effective method of accomplishing the required removal of carbon dioxide is the use of a two-stage carbon dioxide removal system, as hereinafter described in greater detail, in conjunction with the first stage of the process. In accordance with this method, a stream consisting essentially of ammonia, carbon dioxide and water (at least a portion of the ammonia and the carbon dioxide being present as a complex of ammonium carbonate and/or bicarbonate) is withdrawn from the process, treated in the two-stage carbon dioxide removal system, wherein a substantial part of the carbon dioxide is removed with minimum loss of ammonia, and returned to the process. In the first stage of the carbon dioxide removal system, the stream withdrawn from the process is admixed with epsilon-caprolactone to effect reaction between the ammonia and epsilon-caprolactone; while in the second stage heat is applied to effect release of the carbon dioxide which is then removed from the system. Since the ammonia has been reacted with the epsilon-caprolactone it will not flash off and be lost from the second stage, so that a substantial portion of the carbon dioxide can be removed with very little loss of ammonia. The effluent from the second stage of the carbon dioxide removal system may be fed to the first stage of the two-stage process. The carbon dioxide released in the second stage may be simply vented to the atmosphere or it may be recovered where such recovery is economically feasible. (Where the feed to the process consists of one or more derivatives of epsilon-caprolactone, as hereinbefore described, then such feed can be employed to tie up the ammonia in the first stage of the carbon dioxide removal system.)

In operating the preferred carbon dioxide removal system described above, two tanks may be employed to serve respectively as the first and second stages. Epsilon-caprolactone is fed to the first tank in an amount sufficient to provide a molar ratio of at least about 0.8 mole of epsilon-caprolactone per mole of ammonia, and preferably a molar ratio of at least about 1, so as to ensure that a major proportion of the ammonia will undergo reaction. This tank is operated at a temperature of below about 200° C., preferably at a temperature in the range from about 40° C. to about 150° C., and at a pressure at least equal to the autogenous pressure. Elevated pressures of up to, for example, about 500 p.s.i.g. may be employed if desired. Contact time in the first tank may vary from several minutes to several hours and may be readily controlled by the use of conventional recycle techniques. Preferably, sufficient contact time is provided for equilibrium conditions to be established. The reaction of ammonia and epsilon-caprolactone under these conditions will result in the formation of ammoniated derivatives of caprolactone such as epsilon-hydroxycaproamide, ammonium epsilon-hydroxycaproate, and the like.

The effluent from the first tank is fed to the second tank which is operated under conditions adapted to effect release of the carbon dioxide from the solution, i.e. lower pressure and/or higher temperature, and which provides means for discharging the carbon dioxide which is released, for example, a vent to atmosphere. To achieve this result the second tank is ordinarily operated at a higher temperature than the first tank, for example, a temperature of about 20 degrees higher. Moreover, the second tank is ordinarily and preferably operated at atmospheric pressure but elevated pressure may be employed if desired. Contact time in the second tank is not critical and may be regulated as desired by the use of recycle. The solubility of carbon dioxide in the effluent from the removal system will be determined by the temperature and pressure at which the second tank is operated.

The accompanying drawing illustrates a particular embodiment of the two-stage process of United States Patent 3,320,241 including the two-stage carbon dioxide removal system described hereinabove. As shown in the drawing, epsilon-caprolactone and ammonia are continuously fed to mixing tank 10 operating at, for example, 100° C. and 50 p.s.i.g., where they are thoroughly mixed with incoming recycle streams and the resulting reaction mixture is continuously pumped by pump 12 to high pressure reactor 14 operating at, for example, 365° C. and 5000 p.s.i.g. The product stream from reactor 14 is directed through a motor valve 16 which reduces the pressure and then to flash evaporator 18 where the decrease in pressure results in vaporization of most of the unreacted ammonia and water which is removed as an overhead stream, with a portion of the water being removed from the system as a purge stream. The overhead stream from flash evaporator 18 is divided and a portion which may, for example, be about 10 to 20 percent of the total, is directed to the carbon dioxide removal system, comprising tanks 28 and 30, and the remainder is recycled to mixing tank 10. In tank 28, an epsilon-caprolactone feed stream is thoroughly admixed with the incoming portion of the overhead stream from flash evaporator 18 to effect reaction between the ammonia and the epsilon-caprolactone and then the effluent from tank 28 is charged directly to tank 30 wherein carbon dioxide is released from solution and vented to atmosphere. The effluent from tank 30 joins other recycle streams and enters mixing tank 10. The bottoms stream from flash evaporator 18 containing the epsilon-caprolactam and various reaction intermediates, which may, for example, be about 50 percent of the volume of the product stream from reactor 14, serves as the feed to extraction column 20. In extraction column 20, a continuous countercurrent liquid-liquid extraction is effected with the epsilon-caprolactam being recovered in an overhead extract stream and the reaction intermediates being removed from the bottom of extraction column 20 as a raffinate stream. The raffinate stream is recycled to mixing tank 10 while the overhead extract stream is fed to vaporizer 22 and the extractant present in such stream, after separation as a vapor in separator 24 and condensation, is introduced to the bottom of extraction column 20 along with the incoming fresh extractant. The crude epsilon-caprolactam stream from vaporizer 22 serves as the feed to distillation column 26 which yields purified epsilon-caprolactam as an overhead stream and residues as a bottom stream which is recycled to mixing tank 10. In actual operation two or more vaporizers, operated in series, may be employed in place of vaporizer 22 and two or more distillation columns, operated in series, may be employed in place of distillation column 26.

In operation of the process, the carbon dioxide removal system can be controlled to remove carbon dioxide from the process at the rate at which it is formed so as to maintain a constant low concentration of carbon dioxide in the feed stream to reactor 14, for example, a concentration of 2 percent by weight. Depending upon the operating conditions, the total amount of epsilon-caprolactone to be charged to the process may be fed to tank 28 or a portion may be fed to tank 28 and a second portion to mixing tank 10. The total amount of epsilon-caprolactone required at steady state operation depends, of course, upon the single-pass yield of epsilon-caprolactam from epsilon-caprolactone. The higher the single-pass yield the greater the amount of epsilon-caprolactone charged to the process and thus the greater the amount of epsilon-caprolactone which is available for utilization in the carbon dioxide removal system and the lower the level at which the carbon dioxide concentration could be maintainned.

It has been found that, under suitable operating conditions, in excess of 85 percent of the carbon dioxide in the stream entering the first tank of the removal system can be vented from the second tank with a loss of less than 5 percent of the ammonia.

As pointed out hereinbefore, the exact manner in which build-up of carbon dioxide in the reaction system serves to cause a decrease in single-pass yield is not known. It has been determined, however, that the carbon dioxide does not decrease yield by acting as a scavenger of the excess ammonia required for the reaction to produce epsilon-caprolactam from epsilon-caprolactone. Thus, the single-pass yield obtained at a given mole ratio of ammonia to epsilon-caprolactone with a system free of carbon dioxide is not the same as that obtained where carbon dioxide is present and a higher mole ratio of ammonia to epsilon-caprolactone is utilized in an attempt to compensate for the presence of the carbon dioxide, i.e. in an attempt to give an equivalent mole ratio in spite of the fact that part of the ammonia may be tied up by reaction with the carbon dioxide.

As will be apparent to one skilled in the art, the carbon dioxide removal system described herein is one which utilizes simple equipment, and thus requires low capital investment, and which involves no raw material cost. The effluent from the carbon dioxide removal system serves as an equivalent of epsilon-caprolactone as a feed for the reaction. Thus, the carbon dioxide removal is accomplished merely by diverting all or a portion of the epsilon-caprolactone utilized as feed for the two-stage process to the carbon dioxide removal system. Of course, the amount of epsilon-caprolactone which can be charged to the carbon dioxide removal system may not be independently established but is determined, in effect, by the yield of epsilon-caprolactam in the second stage reaction, which in turn is determined by the operating conditions. However, no difficulty is encountered in providing suitable molar ratios of epsilon-caprolactone to ammonia in the carbon dioxide removal system as the fraction of the overhead stream from the flash evaporator which is diverted to the carbon dioxide removal system may be easily varied to provide the necessary control.

The invention is further illustrated by the following examples of its practice. In these examples, the term "single-pass yield" is taken to mean the number of moles of epsilon-caprolactam produced per mole of epsilon-caprolactone equivalents fed to the second stage reaction system times one hundred percent.

EXAMPLE 1

To illustrate the effect of carbon dioxide concentration in the reaction zone on the yield of epsilon-caprolactam, the two-stage process described hereinabove was operated without recycle and fixed levels of carbon dioxide in the feed stream entering the reactor, which would be substantially equivalent in each case to the concentration of carbon dioxide in the reaction zone, were established by addition of ammonium carbonate to the feed to the reactor. The process was carried out by mixing epsilon-caprolactone and aqueous ammonia in the first stage, i.e. the mixing tank, at about 100° C. and about 50 p.s.i.g. and then charging the resulting mixture to the second stage, i.e. the high pressure reactor, operated at 350° C. and 4000 p.s.i.g. and with a contact time of 40 minutes, a ratio of ammonia to epsilon-caprolactone of 3 to 1, and a ratio of water to epsilon-caprolactone of 10 to 1. The values reported in Table I below are average values taken from a plot of single-pass yield against concentration of carbon dioxide.

TABLE I

| Concentration of $CO_2$ in reactor feed (wt. percent) | Single-pass yield (percent) |
| --- | --- |
| 0.1 | 29.5 |
| 0.5 | 29 |
| 1.0 | 28.5 |
| 2.0 | 28 |
| 3.0 | 26 |
| 4.0 | 24 |
| 5.0 | 22 |
| 6.0 | 19 |
| 7.0 | 15 |

As evidenced by the data in Table I, the yield of epsilon-caprolactam decreases sharply with increasing concentration of carbon dioxide in the reaction zone.

EXAMPLE 2

To further illustrate the effect of carbon dioxide concentration in the reaction zone on the yield of epsilon-caprolactam, measurements were taken over a period of fifteen days of continuous recycle operation of the two-stage process described hereinabove, with the concentration of carbon dioxide in the reactor feed, and thus in the reaction zone, having been intentionally decreased on the thirteenth day by purging part of the overhead stream from the flash evaporator. The concentrations of carbon dioxide reported are solely a result of the build-up of carbon dioxide formed in the process system, i.e. there was no addition of ammonium carbonate to the feed during this test. The values reported in Table II below are average values taken from a plot of the actual experimental data. Operating conditions were the same as those described above in Example 1.

TABLE II

| Day | Concentration of $CO_2$ in reactor feed (wt. percent) | Single-pass yield (percent) |
| --- | --- | --- |
| 1 | 1.1 | 30 |
| 3 | 1.6 | 29.5 |
| 5 | 2.1 | 29 |
| 7 | 2.5 | 28.5 |
| 9 | 3.0 | 27.5 |
| 11 | 3.5 | 24 |
| 13 | 4.0 | 21.5 |
| 14 | 1.3 | 24 |
| 15 | 0.2 | 26 |

As is evident upon consideration of the data reported above, there is a continued decrease in single-pass yield with increase in carbon dioxide concentration and then a reversal in the trend and an increase in the single-pass yield following the decrease in carbon dioxide concentration resulting from the purge.

EXAMPLE 3

In an effort to determine the manner whereby carbon dioxide serves to decrease yield, two series of tests were conducted utilizing the two-stage process, operated in each instance without recycle and under the conditions described above in Example 1. In test series I, the ammonia to epsilon-caprolactone ratio was varied, while in test series II ammonium carbonate was added to the reactor feed to provide desired concentrations of carbon dioxide in the reaction zone but the free ammonia (ammonia exclusive of that in the ammonium carbonate added) to epsilon-caprolactone ratio was held fixed at 3 to 1. Results obtained were as follows (values reported for series I were taken from a plot of actual experimental data while those reported for series II are actual test results):

TABLE III

Series I

| $NH_3$/ε-caprolactone ratio: | Single-pass yield (percent) |
|---|---|
| 1.5 | 25.5 |
| 2.0 | 28.5 |
| 2.5 | 29.5 |
| 3.0 | 29.5 |
| 3.5 | 28.5 |

Series II

| Concentration of $CO_2$ in reactor feed (wt. percent) | Single-pass yield (percent) |
|---|---|
| 0 | 30.2 |
| 2.3 | 28.1 |
| 4.4 | 25.0 |
| 7.0 | 18.6 |

As evidenced by the above data, carbon dioxide does not decrease yield merely by acting as a scavenger of the excess ammonia required for the reaction. Thus, for example, a level of carbon dioxide of 6 weight percent of the reactor feed at an ammonia to epsilon-caprolactone ratio of 3 to 1 is equivalent to a reduction in the ratio of free ammonia to epsilon-caprolactone to about 2 to 1, assuming that all carbon dioxide would combine with the ammonia present. If carbon dioxide acted to effect yield merely by reducing the amount of free ammonia available for reaction the yield at a carbon dioxide level of 6 weight percent and an ammonia to epsilon-caprolactone ratio of 3 would then be about the same as the yield where there is no carbon dioxide present and an ammonia to epsilon-caprolactone ratio of 2. The data presented above indicate that it is actually far less, i.e. a yield of about 20 percent as compared to a yield of about 28 percent. In other words, the effect on yield of variation in ammonia to epsilon-caprolactone ratio is slight, while the effect on yield of increasing concentration of carbon dioxide in the reaction zone is very much greater.

EXAMPLE 4

To demonstrate the ability of the two-stage carbon dioxide removal system described herein to function effectively, tests were made at essentially atmospheric pressure on a mixture of ammonia, water and carbon dioxide intended to simulate the overhead stream from the flash evaporator. The simulated stream was treated with epsilon-caprolactone in a two-tank carbon dioxide removal system as hereinabove described and the amount of carbon dioxide and of ammonia removal was determined. Results are summarized for convenience in Table IV below.

EXAMPLE 5

To demonstrate that the effluent from the second stage of the carbon dioxide removal system may be utilized as a feed stream for the two-stage process, tests were conducted in which all of the epsilon-caprolacetone was fed to the carbon dioxide removal system and the effluent from this system was fed to the mixing tank. The operating conditions employed were the same as are described above in Example 1. The results obtained are summarized for convenience in Table V.

TABLE V

| Test No. | Concentration of $CO_2$ in reactor feed (wt. percent) | Single-pass yield (percent) |
|---|---|---|
| V-1 | 0.6 | 27.9 |
| V-2 | 0.7 | 29.6 |
| V-3 | 1.3 | 27.9 |
| V-4 | 1.6 | 27.9 |
| V-5 | 1.9 | 28.5 |

Comparing the data in Table V with that in Table I, it is evident that there is no adverse effect on yield of epsilon-caprolactam as a result of using the effluent from the carbon dioxide removal system as a feed stream to the first stage of the two-stage process.

The present invention is susceptible to various changes and modifications within the broad scope of the teachings set forth herein so that all such changes and modifications as would be apparent to one skilled in the art in light of the disclosure and working examples provided herein are intended to be included within the scope of the appended claims.

What is claimed is:

1. In a process for producing epsilon-caprolactam by reaction with ammonia in the presence of water at superatmospheric pressure and elevated temperature of at least one member selected from the group consisting of epsilon-caprolactone and derivatives thereof capable of being converted to epsilon-caprolactam by the aforesaid reaction; the improvement comprising removing from the process system at least a part of the carbon dioxide generated therein so as to reduce the concentration of carbon dioxide in the reaction zone and thereby obtain an improved yield of epsilon-caprolactam.

2. The improved process of claim 1 wherein the carbon dioxide is removed in an amount sufficient to maintain the concentration of carbon dioxide in the reaction zone at a level of below about 5 percent by weight, based on the total weight of the reaction mixture.

3. In a process for producing epsilon-caprolactam by reaction with ammonia in the presence of water at superatmospheric pressure and elevated temperature of at least one member selected from the group consisting of epsilon-caprolactone and derivatives thereof capable of being converted to epsilon-caprolactam by the aforesaid reaction

TABLE IV

| Test No. | Feed to first tank | | Molar ratio ε-caprolactone/$NH_3$ | Temperature in first tank (° C.) | Temperature in second tank (° C.) | Gas removed (as percent of that charged) | |
|---|---|---|---|---|---|---|---|
| | Percent $CO_2$ | Percent $NH_3$ | | | | $CO_2$ | $NH_3$ |
| IV-1 | 6.2 | 12.9 | 1.33 | 60 | 80 | 53.0 | 1.5 |
| IV-2 | 8.3 | 12.6 | 1.24 | 51 | 75 | 43.3 | 0.4 |
| IV-3 | 5.4 | 17.6 | 0.94 | 55 | 85 | 63.7 | 2.3 |
| IV-4 | 4.3 | 17.1 | 0.88 | 57 | 89 | 74.3 | 4.2 |
| IV-5 | 4.8 | 16.2 | 0.97 | 59 | 90 | 84.5 | 4.6 |
| IV-6 | 3.7 | 13.2 | 1.34 | 41 | 90 | 72.3 | 7.6 |
| IV-7 | 3.4 | 14.4 | 1.33 | 65 | 90 | 89.5 | 3.6 |
| IV-8 | 3.5 | 13.0 | 1.40 | 77 | 90 | 89.9 | 1.5 |
| IV-9 | 8.6 | 9.8 | 1.24 | 76 | 90 | 81.8 | 7.1 |
| IV-10 | 4.6 | 16.2 | 0.79 | 70 | 90 | 82.5 | 4.1 |
| IV-11 | 5.1 | 12.9 | 1.04 | 69 | 95 | 100.0 | 10.5 |

Consideration of the data in Table IV indicates that by use of the two-stage carbon dioxide removal system described herein a major portion of the carbon dioxide in the stream being treated can be removed without substantial loss of the ammonia in the stream.

and in which at least a portion of the reactor effluent is recycled to the reaction zone; the improvement comprising removing from the process system at least a part of the carbon dioxide generated therein so as to maintain the concentration of carbon dioxide in said reaction zone at a level of below about 5 weight percent, based on the total weight of the reaction mixture, whereby an improved yield of epsilon-caprolactam is obtained.

4. In a continuous two-stage process for producing epsilon-caprolactam from epsilon-caprolactone comprising the steps of (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 300° C. to about 400° C. and a pressure of at least about 2000 p.s.i.g. for a period of time sufficient to produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of epsilon-caprolactone, ammonia and water being such as to maintain a ratio of about 2 to about 12 moles of ammonia and about 3 to about 26 moles of water per mole equivalent of epsilon-caprolactone in step (1); the improvement which comprises removing carbon dioxide produced in the process in an amount sufficient to maintain the concentration of carbon dioxide in the reaction mixture entering step (2) at a level of below about 5 percent by weight, whereby an improved yield of episolon-caprolactam is obtained.

5. The improved process of claim 4 wherein removal of the carbon dioxide is effected by withdrawing from the process a stream consisting essentially of water, ammonia and carbon dioxide, admixing said stream with epsilon-caprolactone, in a proportion of at least about 0.5 mole of epsilon-caprolactone per mole of ammonia, at a temperature of below about 200° C. and at a pressure at least equal to the autogenous pressure to effect reaction between the epsilon-caprolactone and the ammonia, subsequently effecting release of carbon dioxide from said stream, and then returning said stream from which at least a part of the carbon dioxide has been thus removed to the process.

6. In a continuous two-stage process for producing epsilon-caprolactam from epsilon-caprolactone comprising the steps of (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 300° C. to about 400° C. and a pressure of from about 2500 p.s.i.g. to about 10,000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of the epsilon-caprolactone, ammonia and water being such as to maintain a ratio of about 2 to about 12 moles of ammonia and about 3 to about 26 moles of water per mole equivalent of epsilon-caprolactone in step (1); the improvement which comprises continuously removing the carbon dioxide produced in the process in an amount sufficient to maintain the concentration of carbon dioxide in the reaction mixture entering step (2) at a level of below about 5 percent by weight, whereby an improved yield of epsilon-caprolactam is obtained.

7. The improved process of claim 6 wherein the carbon dioxide is removed in an amount sufficient to maintain the concentration of carbon dioxide at a level of below about 2.5 percent by weight.

8. The improved process of claim 6 wherein removal of the carbon dioxide is effected by withdrawing from the process a stream consisting essentially of water, ammonia and carbon dioxide, admixing said stream with epsilon-caprolactone, in a proportion of at least about 0.5 mole of epsilon-caprolactone per mole of ammonia, at a temperature of below about 200° C. and at a pressure at least equal to the autogenous pressure to effect reaction between the epsilon-caprolactone and the ammonia, subsequently effecting release of carbon dioxide from said stream, and then returning said stream from which at least a part of the carbon dioxide has been thus removed to the process.

9. In a continuous two-stage process for producing epsilon-caprolactam from epsilon-caprolactone comprising the steps of (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 335° C. to about 370° C. and a pressure of from about 3000 p.s.i.g. to about 5000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of epsilon-caprolactone, ammonia and water being such as to maintain a ratio of about 3 to about 5 moles of ammonia and about 5 to about 20 moles of water per mole equivalent of epsilon-caprolactone in step (1); the improvement which comprises continuously removing the carbon dioxide produced in the process in an amount sufficient to maintain the concentration of carbon dioxide in the reaction mixture entering step (2) at a level of below about 5 percent by weight, whereby an improved yield of epsilon-caprolactam is obtained.

10. The improved process of claim 9 wherein the carbon dioxide is removed in an amount sufficient to maintain the concentration of carbon dioxide at a level of below about 2.5 percent by weight.

11. The improved process of claim 9 wherein removal of the carbon dioxide is effected by withdrawing from the process a stream consisting essentially of water, ammonia and carbon dioxide, admixing said stream with epsilon-caprolactone, in a proportion of at least about 0.5 mole of epsilon-caprolactone per mole of ammonia, at a temperature of below about 200° C. and at a pressure at least equal to the autogenous pressure to effect reaction between the epsilon-caprolactone and the ammonia, subsequently effecting release of carbon dioxide from said stream, and then returning said stream from which at least a part of the carbon dioxide has been thus removed to the process.

References Cited
UNITED STATES PATENTS

| | | | |
|---|---|---|---|
| 3,000,878 | 9/1961 | Phillips et al. | 260—239.3 |
| 3,320,241 | 5/1967 | Kyle et al. | 260—239.3 |

HENRY R. JILES, Primary Examiner

R. T. BOND, Assistant Examiner